United States Patent [19]

Parsons

[11] Patent Number: 5,080,053
[45] Date of Patent: Jan. 14, 1992

[54] ROTARY DRIVES

[75] Inventor: Bryan N. V. Parsons, Stoney Stanton, United Kingdom

[73] Assignee: Jaguar Cars Limited, United Kingdom

[21] Appl. No.: 609,594

[22] Filed: Nov. 6, 1990

[30] Foreign Application Priority Data

Nov. 15, 1989 [GB] United Kingdom ............... 8925869

[51] Int. Cl.$^5$ .............................................. F01L 1/34
[52] U.S. Cl. .............................. 123/90.15; 123/40.17; 123/90.31; 74/395; 74/568 R
[58] Field of Search ............ 123/90.15, 90.16, 90.17, 123/90.27, 90.31; 74/395, 568 R

[56] References Cited

U.S. PATENT DOCUMENTS

| | | | |
|---|---|---|---|
| 3,633,555 | 1/1972 | Raggi | 74/568 R |
| 4,747,375 | 5/1988 | Williams | 123/90.15 |
| 4,802,376 | 2/1989 | Stidworthy | 123/90.15 |
| 4,805,566 | 2/1989 | Ampferer | 123/90.15 |

FOREIGN PATENT DOCUMENTS

| | | |
|---|---|---|
| 0179581 | 10/1984 | European Pat. Off. . |
| 0181079 | 11/1984 | European Pat. Off. . |
| 3719475 | 6/1987 | Fed. Rep. of Germany . |
| 11812 | 1/1990 | Japan ........................ 123/90.16 |
| 408426 | 4/1934 | United Kingdom . |
| 2089932 | 6/1982 | United Kingdom . |
| 2150666 | 12/1984 | United Kingdom . |
| 2224094 | 4/1990 | United Kingdom ........... 123/90.17 |
| 86/06451 | 11/1986 | World Int. Prop. O. . |
| 88/08919 | 5/1988 | World Int. Prop. O. . |

Primary Examiner—E. Rollins Cross
Assistant Examiner—Weilun Lo
Attorney, Agent, or Firm—Davis, Bujold & Streck

[57] ABSTRACT

A drive mechanism includes an internal gear rotatably mounted on an eccentric, the eccentric being mounted on a drive shaft for rotation therewith, said internal gear having an arm with an elongate slot, a block being pivotally mounted on a pin slidably located in the slot, an external gear being rotatably mounted coaxially of the internal gear and in mesh therewith, the position of the pin being adjustable relative to the axis of the drive shaft.

10 Claims, 4 Drawing Sheets

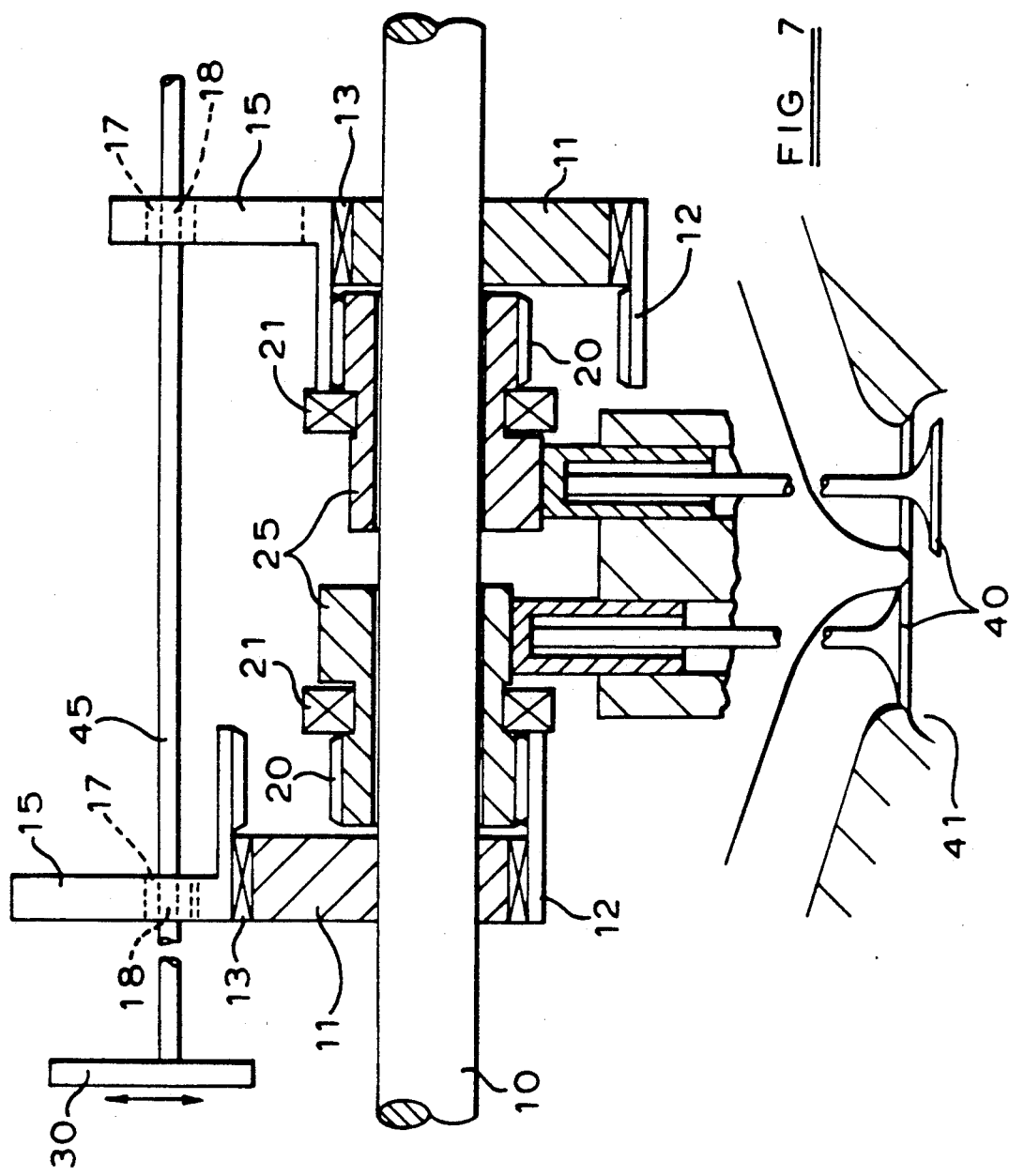

ROTARY DRIVES

BACKGROUND TO THE INVENTION

The present invention relates to rotary drives and in particular rotary drives in which the drive ratio is varied sinusoidally during each revolution.

SUMMARY OF THE INVENTION

According to one aspect of the present invention a drive mechanism comprises an internal gear and an external gear, one of said gears being rotatably mounted on an eccentric, the eccentric being mounted on a drive shaft for rotation therewith, said one gear having a formation which engages a complimentary formation, the formation on the gear being capable of linear and pivotal movement relative to the said complimentary formation, said other gear being rotatably mounted coaxially of the drive shaft in meshing engagement with said one gear.

With the drive mechanism described above, the inter-engaging formations prevent rotation of said one gear. However, rotation of the eccentric will cause the gear to oscillate in eccentric manner and reaction with said other gear, will cause said other gear to rotate in reverse direction to the drive shaft.

The overall drive ratio of this mechanism will depend upon the ratio of the diameters of the internal and external gears. However, engagement of the formation on said one gear with the complimentary formation will impose a rotary oscillation on that gear, thus introducing a substantially sinusoidal variation into the rotation of said other gear.

The magnitude of the variation depends upon the position at which the complimentary formation engages the formation on said one gear. The position of the complimentary formation may consequently be varied to vary the relative movement of the drive shaft and other gear over a portion of one revolution of the drive shaft, thus enabling variation in the drive ratio over that portion of the revolution. This mechanism may consequently be used, for example, to vary the valve timing of an internal combustion engine.

BRIEF DESCRIPTION OF THE DRAWINGS

An embodiment of the invention is now described, by way of example only, with reference to the accompanying drawings, in which:

FIG. 7 illustrates a valve mechanism for an internal combustion engine using cam mechanisms as illustrated in FIG. 1.

DESCRIPTION OF A PREFERRED EMBODIMENT

Figure 1:
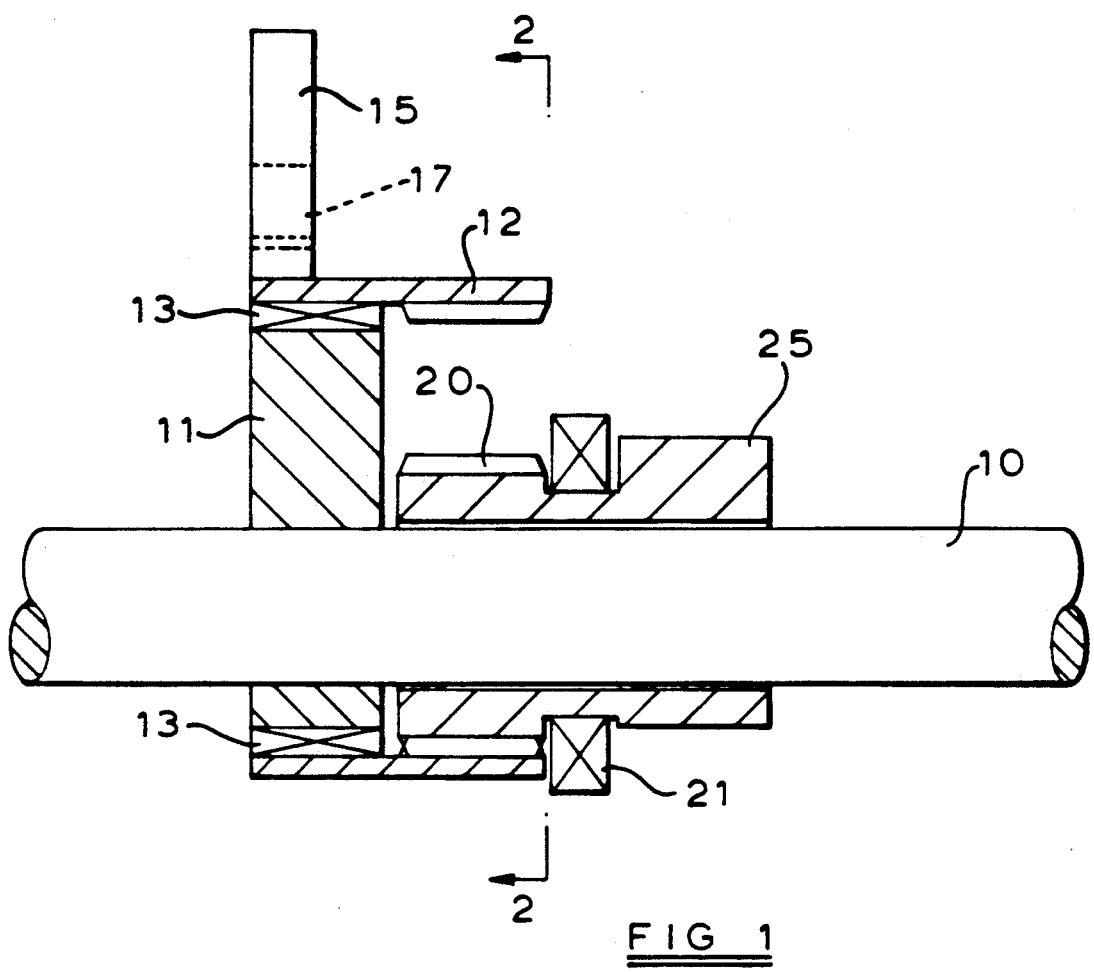
FIG. 1 illustrates diagramatically in sectional elevation, a cam mechanism for the valves of an internal combustion engine including a drive mechanism in accordance with the present invention.

The cam mechanism illustrated in the accompanying drawings comprises a drive shaft which is drivingly connected to the crank shaft of an engine in suitable manner, to provide a one to one drive ratio. An eccentric 11 is mounted on the drive shaft 10 for rotation therewith and an internal gear 12 is rotatably mounted on the eccentric 11 by means of bearing 13.

An arm 15 extends radially from the internal gear 12, the arm 15 having a radially extending slot 16. A block 17 is slidingly located in the slot 16, the block 17 being pivotally mounted on a pin 18.

An external gear 20 is rotatably mounted coaxially of the drive shaft 10 in bearing 21, the external gear 20 meshing with the internal gear 12. A cam 25 is formed integrally of the external gear 20, for rotation therewith.

The cam 25 is arranged to control a poppet type valve, via a tappet, in conventional manner.

With the above mechanism, upon rotation of the drive shaft 10, the internal gear 12 which is prevented from rotation by engagement of the block 17 in slot 16, will oscillate eccentrically about the drive shaft 10. The reaction between the internal gear 12 and external gear 20 will cause the external gear 20 to rotate but in reverse direction to the drive shaft 10. The ratio of the diameters of the internal gear 12 and external gear 20 is 3 to 2 giving an overall reduction in drive from the drive shaft to the external gear of 2 to 1.

As illustrated in FIGS. 2 to 5, as the internal gear oscillates eccentrically about the drive shaft 10, the block 17 slides within slot 16. However, engagement of the slot 16 by block 17 also imposes a rotational oscillation on the internal gear 12, block 17 pivoting about pin 18.

Figure 2:
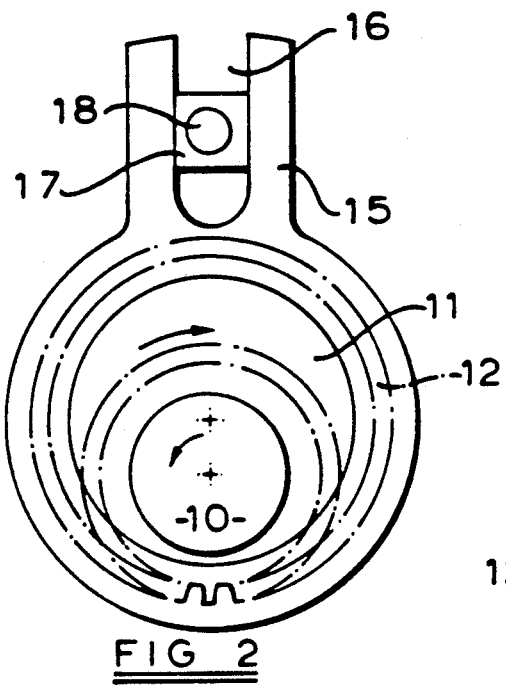
FIG. 2 shows a section along the line II—II of FIG. 1.
Figure 3:
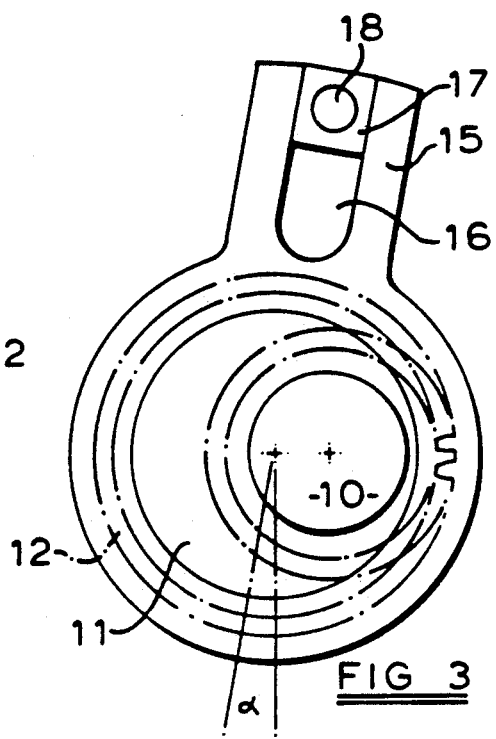
FIGS. 3 to 5 show views similar to FIG. 2 illustrating the relative positions of the components as the drive shaft rotates through 90° increments.
Figure 4:
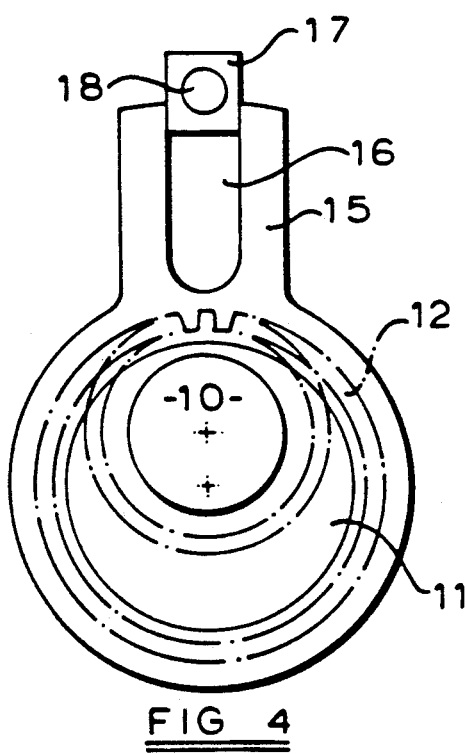
Figure 5:
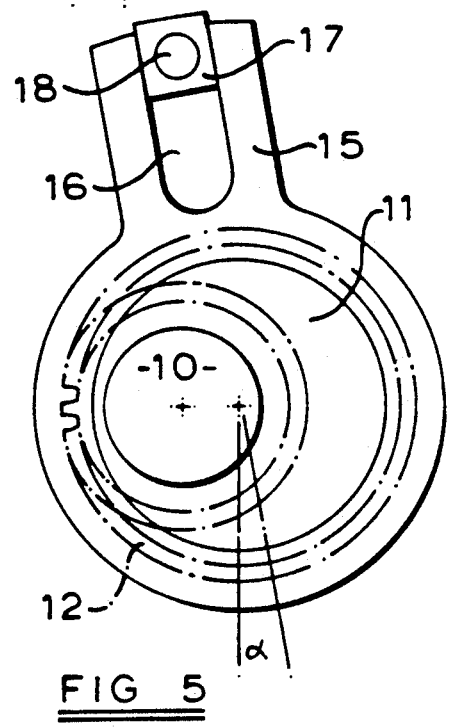

As a result of this rotational oscillation of the internal gear 12, during one revolution of the drive shaft 10; the internal gear 12 will first move ahead of the drive shaft 10, for example as illustrated in FIG. 3, after the drive shaft 10 has moved through 90° the internal gear 12 has moved through 90° + α; over the next 90° of rotation of drive shaft 10, the internal gear 12 will move back into phase with drive shaft 10 as illustrated in FIG. 4; again over the next 90° of rotation of the drive shaft 10 the internal gear 12 will move through 90° + α as illustrated in FIG. 5; and in the final 90° of rotation of drive shaft 10 the internal gear 12 will move back into phase with drive shaft 10 as shown in FIG. 2.

This variation in movement of the internal gear 12 will be imposed on the rotation of external gear 20 but due to the 3 to 2 gear ratio the oscillatory variation in angular movement of the internal gear 12, will give one and a half times the variation in the angular velocity of the external gear 20.

Figure 6:
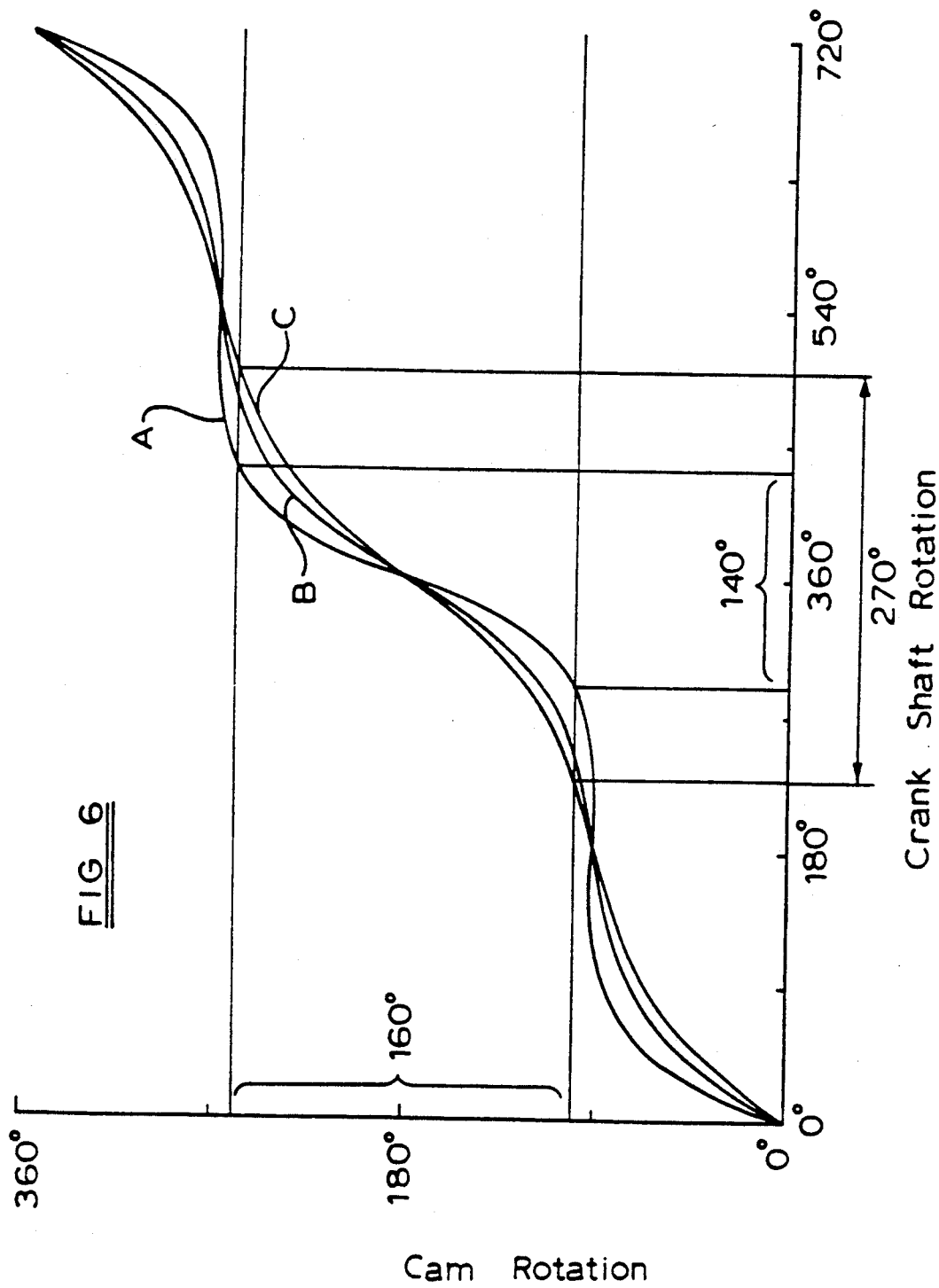
FIG. 6 illustrates plots of cam rotation against cam shaft rotation for the mechanism illustrates in FIG. 1.

FIG. 6 shows the plot of the variation in rotation of the external gear 20 and hence cam 25 with rotation of the crank shaft of the engine.

As illustrated in FIG. 6, the magnitude of angle and hence the variation in rotation of cam 25 relative to the crank shaft, depends on the radial separation of the block 17 from the axis of rotation of drive shaft 10. In FIG. 6, plot A represents the curve where the separation between the block 17 and axis of drive shaft 10 is equal to twice the eccentricity of eccentric 11, plot B separation equals three times the eccentricity of eccentric 11 and plot C the separation equals four times the eccentricity of eccentric 11. As illustrated in FIG. 6, for a cam 25 with an included angle 160°, the corresponding rotation of the crank shaft may be varied from 270° when the separation between the block 17 and axis of rotation of drive shaft 10 is equal to four times the eccentricity of eccentric 11; to 140° when the separation is equal to twice the eccentricity of eccentric 11.

Means 30 (as illustrated in FIG. 7) may therefore be provided to vary the position of pin 18 so that the timing of the valve opening may be adjusted as required.

As illustrated in FIG. 7 several such cam mechanisms may be mounted on a common drive shaft 10 to control the valves 40 associated with each cylinder 41 of the engine. With such an arrangement, the eccentrics 11 of each mechanism would be arranged in appropriate phase relationship. The arms 15 of one of more cam mechanisms may however be aligned so that each block 17 could be pivotally mounted on a common member defining pins 18, allowing the timing of the valves 40 controlled by these mechanisms to be adjusted together. In this manner, the inlet valves of the engine may, for example, be controlled by common means and the outlet valves controlled by common means.

Various modifications may be made without departing from the invention. For example, in an alternative embodiment the external gear may be mounted for eccentric movement and pinned while the internal gear is mounted for rotation. With such a mechanism, in order to provide a 2 to 1 drive ratio, the diameters of the internal and external gears will be in the ratio of 2 to 1.

I claim:

1. A drive mechanism comprising an internal gear and an external gear, one of said gears being rotatably mounted on an eccentric, the eccentric being mounted on a drive shaft for rotation therewith, said one gear having a formation which engages a complimentary formation, the formation on the gear being capable of linear and pivotal movement relative to the said complimentary formation, said other gear being rotatably mounted coaxially of the drive shaft in meshing engagement with said one gear, the position of the complimentary formation being adjustable relative to the axis of the drive shaft.

2. A drive mechanism according to claim 1 in which the internal gear is mounted on the eccentric with a bearing therebetween, the external gear being mounted concentrically of the drive shaft in suitable bearing means.

3. A drive mechanism according to claim 2 in which the bearing means is located externally of the external gear.

4. A drive mechanism according to claim 2 in which the ratio of the diameters of the internal and external gears is 3 to 2.

5. A drive mechanism according to claim 1 in which the external gear is mounted on the eccentric with a bearing therebetween, the internal gear being mounted concentrically of the drive shaft in suitable bearing means.

6. A drive mechanism according to claim 5 in which the ratio of the diameters of the internal and external gear is 2 to 1.

7. A drive mechanism according to claim 1 in which the formation on said one gear comprises a radially extending arm with a radial slot therein, the complimentary formation comprising a block which slidably locates in the slot, said block being pivotally mounted about a pin.

8. A cam mechanism comprising a drive mechanism as claimed in claim 1, a cam being drivably interconnected with said other gear, the ratio of the diameters of the internal and external gear giving a reduction in drive of 2 to 1.

9. A valve mechanism for an internal combustion engine comprising a plurality of cam mechanisms as claimed in claim 8, the cam mechanisms being provided on a common drive shaft, the orientation of the eccentrics being varied to provide the appropriate phase relationship for controlling the valves of the engine, means being provided to move the complimentary formations in order to vary the timing of the valve.

10. A valve mechanism according to claim 9 in which the complimentary formations associated with two or more cam mechanisms are arranged to be adjusted together.

* * * * *